April 18, 1967 A. W. FRIEND 3,315,119

CATHODE RAY TUBE CONTROL CIRCUIT HAVING MULTI-FUNCTION VACUUM TUBE

Filed July 19, 1963 2 Sheets-Sheet 1

INVENTOR

Albert W. Friend

BY Hall, Pollock & Vande Sande

ATTORNEYS

April 18, 1967

A. W. FRIEND 3,315,119

CATHODE RAY TUBE CONTROL CIRCUIT HAVING MULTI-FUNCTION VACUUM TUBE

Filed July 19, 1963

2 Sheets-Sheet 2

INVENTOR

Albert W. Friend

BY Hall, Pollock & Vande Sande

ATTORNEYS 3,315,119
Patented Apr. 18, 1967

3,315,119

CATHODE RAY TUBE CONTROL CIRCUIT HAVING MULTI-FUNCTION VACUUM TUBE

Albert W. Friend, 5903 City Line Ave., Philadelphia, Pa. 19131

Filed July 19, 1963, Ser. No. 296,867
12 Claims. (Cl. 315—19)

This invention relates to a vacuum tube to serve in television service as a horizontal deflection damper, and high voltage regulator and rectifier device, and it relates also to the circuit for its application.

More particularly, the invention relates to a control system for the anode-cathode circuit of a cathode ray tube in a color television receiving system.

Heretofore, the aforesaid anode-cathode circuit has employed three separate vacuum tubes in this application; (1) a diode or triode damper tube to damp the retrace transient oscillation, to produce the negative portion of the linear scan sawtooth current, and to recover the energy stored in the horizontal deflection transformer and deflection yoke magnetic fields; (2) a high voltage triode tube for shunt regulation of the voltage applied essentially between the cathodes and the final anode and picture screen of the cathode ray picture tube; and (3) a high voltage diode rectifier tube to rectify the high peak voltage pulses produced across the windings of the horizontal deflection transformer, to store electrostatic energy in a capacitance from which electron beam energy is withdrawn as needed during each horizontal scan line period. The aforesaid prior art circuits have given considerable difficulty in size and cost reduction because of insulation and spacing requirements of the several tubes, components and conducting wires.

It is a main object of this invention to provide a new and improved circuit arrangement for the anode-cathode circuit of a cathode ray tube to be used in television, and especially color television, and also in cathode ray displays for certain systems, radar and other such applications.

Another object of the invention is to provide circuitry in connection with the anode-cathode circuit of a cathode ray tube which is simpler, of lower cost, and more reliable than in the case of the prior art.

Yet another object of the invention is to provide circuitry for the anode-cathode circuit of a cathode ray tube, with particular reference to television and to color television in particular.

Still another object of the invention is to provide circuitry which avoids the insulation and high voltage protection space problems of the prior art.

Another object of the invention is to reduce the number of separate tubes and components in the anode-cathode circuit.

A further object of the invention is to provide an improved tube which will pass current simultaneously and/or alternately in opposite directions therethrough.

A further object of the invention is to provide an improved tube for use in the anode-cathode circuit of a cathode ray tube.

A still further object of the invention is to provide an improved tube for use in the anode-cathode circuit of a cathode ray tube used in color television.

Still another class of objectives is to combine the functions of a damper diode( or triode) vacuum tube of a periodic electron beam deflection circuit with those of a triode high voltage regulator tube, and high voltage rectifier diode in a cooperative manner, in a single vacuum tube envelope.

An objective of this class is to cause the electron stream of the damper diode or triode portion of the vacuum tube to furnish the required electron supply for operation of the voltage regulator triode portion of the tube.

A further objective is to cause the variation of the current flow of the damper portion to enhance the performance of the regulator portion of the tube in its high voltage control function.

A still further objective is to eliminate interconnecting circuitry and components between the damper tube equivalent portion, the voltage regulator tube equivalent portion, and the high voltage regulator tube equivalent portion.

Yet another object is to combine all these three functions with that of the cathode-anode circuit of a cathode ray tube, and in particular a television cathode ray picture tube.

In order to carry out the aforesaid objects, I provide a combination of three vacuum tube functions: (1) damper, (2) high voltage rectifier; and (3) high voltage regulator, all within a single envelope in a codependent relationship. The damper tube functions essentially in accordance with the prior art concepts except that means are provided for feeding out part of the electron stream of said damper tube portion to form a virtual cathode for the regulator tube portion. This electron stream flows out through perforations or slots in the anode of the damper tube and is further controlled by a grid structure which comprises a part of the high voltage regulator triode portion. The controlled electron stream of the high voltage regulator triode is collected by a second anode. This triode contains an electrically connected second cathode located within an aperture in said second anode. The cathode within the second anode forms one element of a high voltage diode rectifier portion of this tube. The third anode which serves in this high voltage rectifier portion is attached to or a part of the anode of the damper tube and forms an electrostatic shield about the grid structure of the high voltage regulator triode portion.

The combination of these three vacuum tube functions within one envelope reduces the complexity of the circuitry of the television, and particularly color television, horizontal deflection and high voltage power supply systems. External components at high potential with respect to ground are eliminated within the final anode high voltage (about 24 kv.) supply system.

In carrying out the invention, I employ a special tube which has the low voltage terminals grouped at one end and the high voltage terminals grouped at the other end, with the envelope acting as the high voltage insulation. This tube has two groups of electrodes, from the voltage level viewpoint. One group embraces electrodes which operate at high voltage and the other group includes electrodes which operate at low voltage levels, each group having adjacent anodes and cathodes, the cathode(s) of one group feeding the anode(s) of the other group. Each group has separate anodes and cathodes which may be electrically connected together.

The high voltage group of electrodes is connected to a source of alternating or pulsed current and has a cathode which cooperates with an anode of the low voltage group to provide rectifier action to supply D.C. potential (and current as required) to the anode-cathode circuit of the cathode ray tube, and to its associated energy storage capacitance (condenser) built into that tube or connected to it.

A virtual cathode and a control grid of said low voltage group of electrodes cooperates with the anode of said high voltage group of electrodes to provide a regulator for the potential which represents the energy stored in the effective condenser built into the cathode ray picture tube essentially in parallel with the anode-cathode circuit of that tube.

The virtual cathode of the equivalent triode voltage regulator portion of this new tube is formed by providing for the passage of a small fraction of the electron stream of the damper diode (or triode) portion of the tube into a cavity between the reverse side of the anode of the damper section of this tube and the control grid of the high voltage regulator portion. Negative bias applied to the control grid may retain most of these electrons within the virtual cathode cavity.

Figures 1, 2, 3:
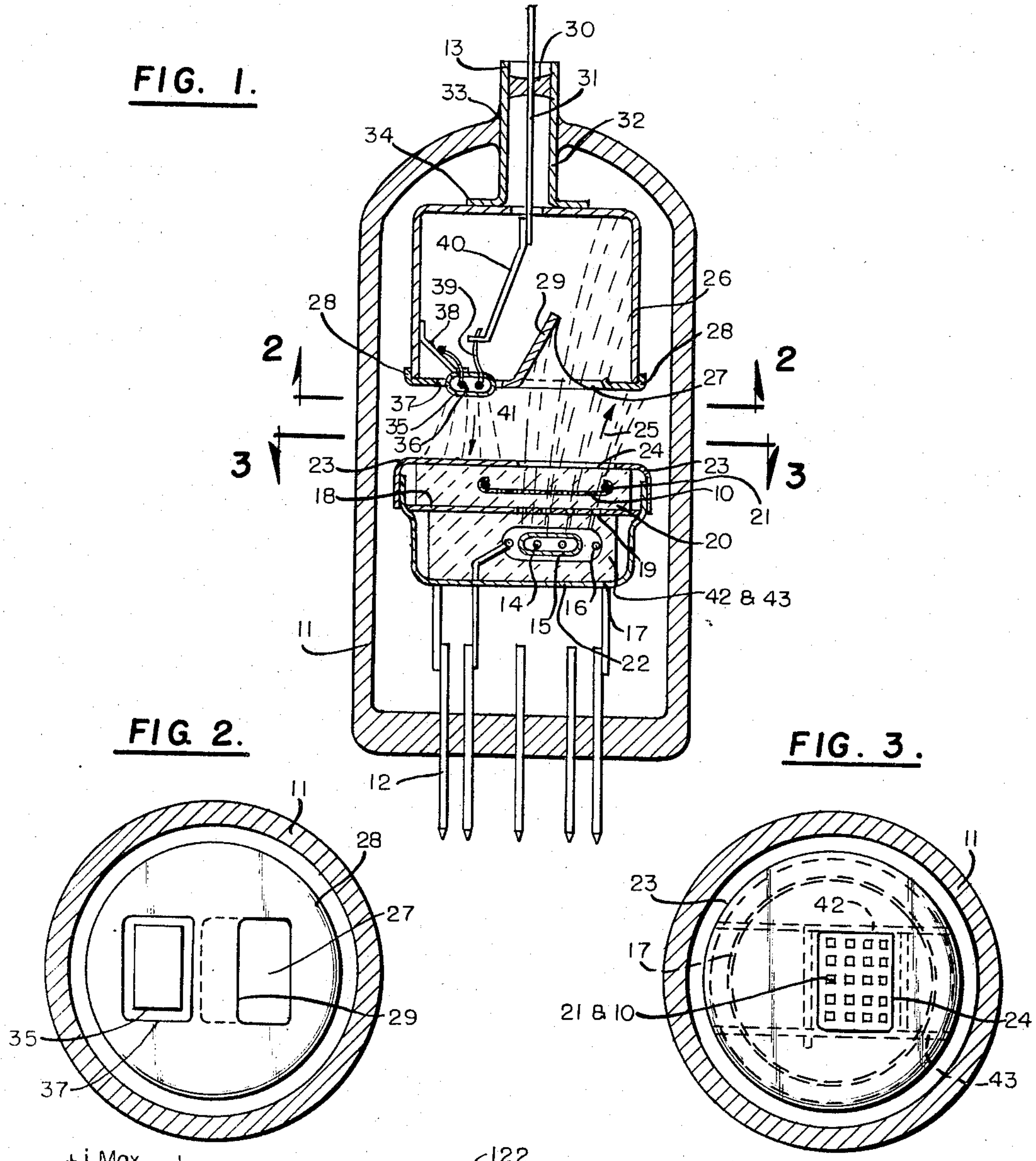
FIGURE 1 is a cross-sectional view of a tube constituting a part of my invention.
FIGURE 2 is a sectional view of FIGURE 1 taken along line 2—2 of FIGURE 1.
FIGURE 3 is a sectional view taken along line 3—3 of FIGURE 1.

A vacuum tube which serves three basic functions is the crux of this invention. FIGURE 1 shows a vacuum envelope 11 of insulating material (glass or ceramic). A button stem 12 serves as the terminal pin header and the internal projections of the pins serve as mounting terminals for the various elements of the "low-voltage" group. An upper button-type header, or a coaxial mount 13 (as shown), connects to and supports each one of the high voltage group of elements.

The damper portion of this tube has a heater element 14, inside a cathode 15, a control grid 16 (if desired), and a plate (anode) 17. The anode 17 is placed all around the periphery of the inner element assembly (14, 15 and 16), but its upper side 18 is partially perforated as shown at 19, to permit electrons to escape into space 20, between the damper portion anode section 18 of anode 17 and the grid 21 of the high voltage regulator portion. Cathode 15, grid 16 and grid 21 are mounted upon mica sheets 42 and 43, as indicated in FIGURES 1 and 3, or upon other suitable insulating mounts.

The lower portion of the anode 17 is composed of a shallow cylindrical metal (or similar conductor) cup 17, with appropriate holes 22 to admit connecting wires. The upper side 18 of this anode 17 is composed of an essentially flat plate of metal (or similar conductor) with perforations as noted at 19. A second shallow cylindrical metal cup 23 is fitted as a cover over grid 21 and anode section 18. It has an aperture (large hole) 24, which is shown in plan view in FIGURE 3. This aperture is placed directly over grid 21 which has perforations 10, as shown in FIGURES 1 and 3, preferably in register with perforations 19 of plate 18. Electrons 25 which are emitted from cathode 15, which are passed by grid 16, and which penetrate through perforations (small holes) 19 of anode section 18, form a virtual cathode between anode part 18 and control grid 21. They may be retained within cavity 20 or they may continue through perforations 10 (or between wires of a wire grid 21), and then pass through hole 24. There they are accelerated by the relatively high potential (20 to 26 kv.) of anode 26, the plate electrode of the high voltage triode voltage regulator portion of this tube. These electrons 25 pass mainly into the interior of anode 26 through louver aperture 27 of the metal lower cup closure 28 of anode 26, as shown in FIGURES 1 and 2.

Louver lip 29 of cup 28 is bent upward and to the left, as shown in FIGURES 1 and 2, to minimize the electron bombardment of the glass seal 30 of the upper central conductor rod 31, within metal tube 32. As an alternative, lip 29 may be omitted, and, if required, a small disk may be applied normal to rod (wire) 31 just below the top aperture 47 in anode 26.

Tubular terminal 32 is sealed at 33 to envelope 11. It supports and connects to the anode cup 26, and all associated high voltage elements, being attached to anode cup 26 through flange 34.

Cathode 35, and its heater 36, are suspended within slot 37 in cup 28, through connecting rod (or wire) support and connection 38 to anode 26, as shown in FIGURES 1 and 2. The return circuit conductor 39 of heater 36 is connected, by wire 40, to terminal pin 31. This emerges through an insulating seal 30, at the top of envelope 11.

Figure 4:
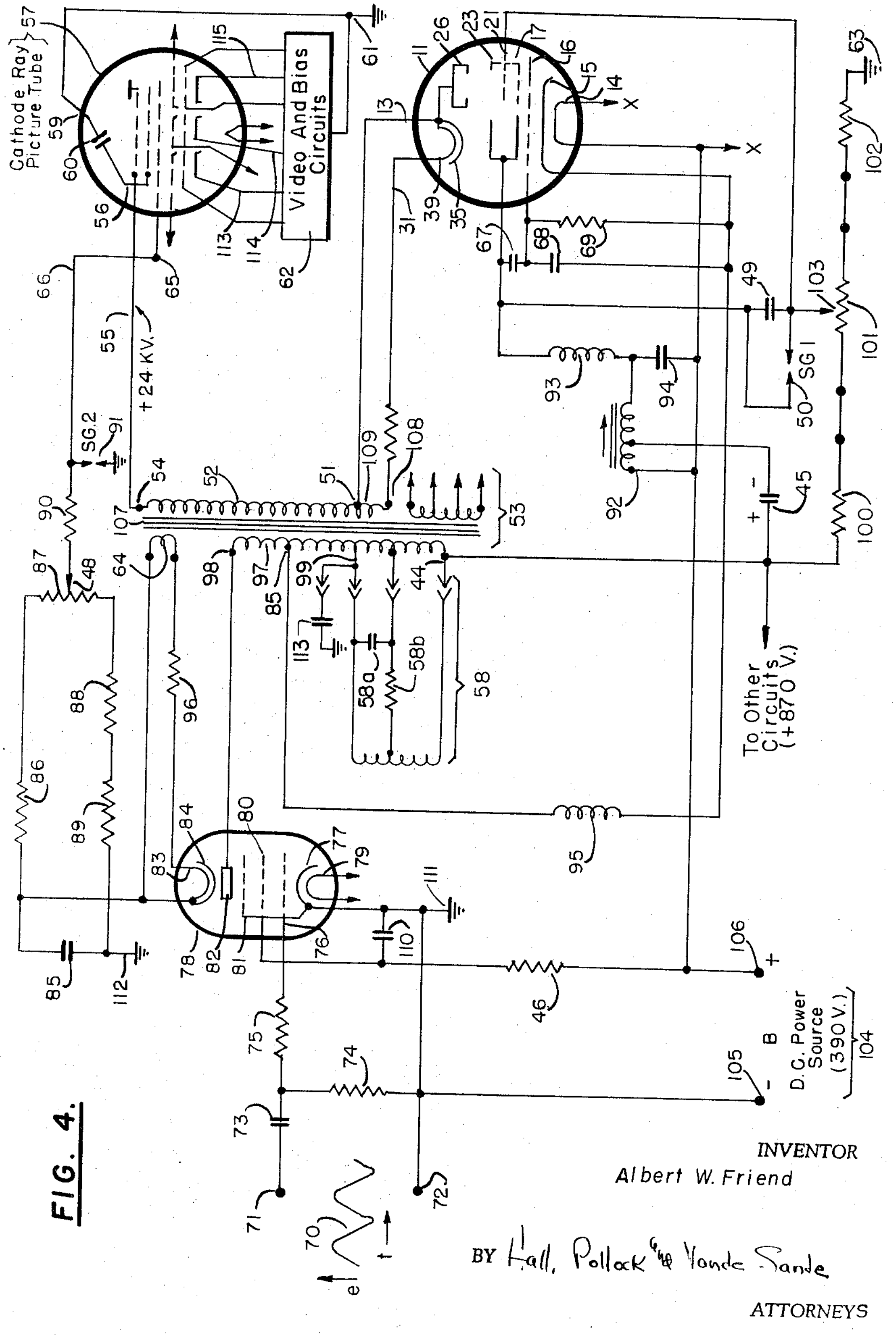
FIGURE 4 is a schematic diagram of apparatus embodying the invention.

Cathode 35 emits electrons 41 to anode 23, when it is driven sufficiently negative with respect to anode 23 by the negative "fly-back" pulse from terminal 51 of high voltage winding 52 of horizontal output transformer 53 of the portion of the television horizontal deflection and high voltage circuit which is shown in FIGURE 4. Cathode 35 and anode 23 form the high voltage rectifier diode portion of the tube of this invention. The positive pulse terminal 54 of high voltage secondary winding 52 is connected via insulated wire 55 to the final anodes and picture screen terminal (ultor) 56 of cathode ray picture tube 57 of FIGURE 4.

An input sawtooth voltage wave 70 of FIGURE 4 is applied across terminals 71 and 72. This wave is of the horizontal deflection frequency if it is used in a television system. Capacitor 73 couples wave 70 across grid-shunting resistor 74, from which it is applied, via the small series damping resistor 75, between the terminals of grid 76 and cathode 77 of the beam pentode horizontal deflection output amplifier portion of tube 78.

Tube 78 is a special combination beam-pentode-diode. In it are a heater 79, cathode 77, control grid 76, screen grid 80, suppressor grid or beam forming elements 81 (connected internally to cathode 77), common anode (plate) 82, cathode 84 (of the diode rectifier portion), and heater 83 (inside cathode 84). Heater 83 (or directly heated cathode 83/84) is excited from winding 64 of transformer 53, through series resistor 96.

Insofar as the invention described and claimed in the present application is concerned, it is to be understood that entirely separate beam pentode horizontal output amplifier and focus rectifier tubes may be utilized if desired, in accordance with prior art. It is preferred to utilize the combined horizontal output and focus rectifier tube 78 of FIGURE 4, to minimize the required space, number of components, and the high voltage insulation.

The anode 82 of tube 78 connects to terminal 98 of primary winding 97 of horizontal output transformer 53, with ferromagnetic core 107. Winding 97 has a second terminal 44 which connects directly to the boosted B+ terminal of B-boost storage capacitor 45, to resistor 100, and to other circuits not shown. Resistor 46 decreases and controls the voltage applied to screen grid 80 of tube 78, and capacitor 110 serves as a screen-grid-to-cathode bypass.

When the sawtooth input signal 70, of FIGURE 4, is applied between terminals 71 and 72 and thence via series capacitor 73, grid shunting resistor 74, and series resistor 75, the grid 76 is driven slightly positive with respect to cathode 77, by the positive peaks of this input voltage. This causes a small rectifier current to flow between grid 76 and cathode 77 of tube 78, and through resistors 74 and 75, in series. The resultant voltage drop in 74 stores a charge upon capacitor 73 and introduces a smoothed negative D.C. bias upon grid 76 with respect to cathode 77. The amplitude of the input wave 70 is sufficiently great that its negative peaks drive the beam pentode portion of tube 78 beyond its current cut-off voltage during roughly half of each cycle.

Figure 5:
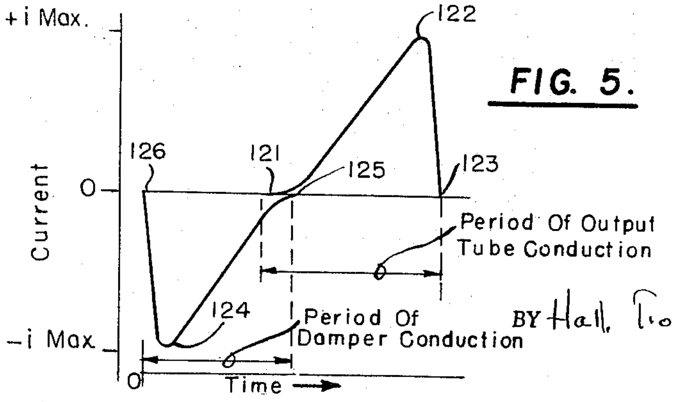
FIGURE 5 is a graph of the general wave form of the currents which flow in the damper portion of the tube of FIGURE 1, and in the horizontal output amplifier tube.

During the latter portion of the scan period, as the sawtooth input voltage increases, the flow of electrons from cathode 77 to anode 82 increases essentially linearly, as indicated in FIGURE 5, from point 121 to a peak value at point 122. At the instant 122 of its peak value, the current which flows from anode 82 to cathode 77 suddenly ceases, as shown by the portion of the curve between 122 and 123. This is caused by the sudden decrease of the voltage of the input wave 70. The sudden cessation of current between anode 82 and cathode 77 causes a voltage pulse to be induced in all windings of transformer 53 and yoke 58. It causes terminals 98 and 54 to become positive with respect to terminals 44 and 51, respectively.

FIGURE 5 is plotted in terms of current transformed to the deflection coil windings. The horizontal output and damper tube currents may be actually somewhat different because of differences of loading and impedance.

The sudden cessation of current between elements 82 and 77 of tube 78 causes a positive pulse to be induced at terminal 98, with respect to 44. This causes a current flow between the diode elements, anode 82 and cathode 84. This current charges storage and smoothing capacitor 85. The D.C. charging current flows from winding 97, terminal 98 to anode 82 of tube 78. Thence it flows from cathode 84 to capacitor 85, to ground (chassis) terminal 112 through terminal 111, through power supply 104 (via terminals 105 and 106) and through the windings of inductors 92 and 93 to anode 17, of the damper portion of tube 11. From the cathode 15 of this tube it flows through the windings of inductor 95 to tap 85 of primary winding 97 of transformer 53.

A series string of resistors 86, 87, 88 and 89 shunts across storage capacitor 85, to serve as a bleeder and voltage divider.

A variable tap 48 upon the potentiometer resistor 87 serves to provide a variable, reduced, voltage between tap 48 and ground. Resistor 90 is in series with lead 66 from tap 48 to focussing anode ("grid 3") terminal of cathode ray picture tube 57. It serves as an isolation resistor, and it may possibly be omitted in some instances. Spark gap 91 (SG2) is a protective device which serves to shunt out any excessive voltage which may appear across its terminals. These are connected between terminal 65 and ground (chassis). Any discharge current from capacitor 85 which flows in the circuit of lead 66 passes via terminal 65 to the three anodes 113, 114 and 115 of color picture tube 57, and thence via the video and bias circuits 62 to ground 61, and via ground 112 to capacitor 85, and the voltage divider, 86, 87, 88, 89 and 90. This current may divide and flow partially via other paths in various proportions, depending upon operating adjustments. The focussing anodes 113, 114 and 115, under certain operating conditions may intercept some of the electron beam current of tube 57, so the current in lead 66 may flow in either direction.

The same flyback pulse causes terminal 51 to swing negative, causing cathode 35 of tube 11 to emit electrons to anode 23. The rectifier pulses charge capacitance 60, a part of cathode ray tube 57. This capacitance 60 is developed between an outside conductive surface coating and a similar internal coating which is connected to the final anode and picture screen terminal 56. This charge flows from the high voltage winding 52, terminal 54, via insulated lead 55, to terminal 56, of tube 57, internally to capacitor 60, and via the coating grounding terminal 59 to ground (chassis) terminal 61. The current proceeds thence via ground terminal 111, power supply 104 (via terminals 105 and 106), inductors 92 and 93, anode 23, cathode 35, and terminal 13 of tube 11, to terminal 51 of the high voltage secondary winding 52.

The sawtooth current 121 to 122 of FIGURE 5, which flows in primary winding 97 of transformer 53, is suddenly prevented from continuing through tube 78 (elements 82 to 77), as previously stated. This produces an induced impulse of voltage which excites damped oscillations in the windings of transformer 53 and in the horizontal deflection windings of the deflection yoke 58, which is applied to tube 57, and associated circuits.

At the onset of the second alternation of this induced oscillation the damper portion of tube 11 comes into action by conduction through electron flow from cathode 15 to anode 17 (and 18) as shown in FIGURES 1 and 4. If grid 16 is omitted, the action is that of a simple diode damper. Resistor 69 would not necessarily be used in this instance, and capacitors 67 and 68 could be combined, or eliminated.

If grid 16 is utilized, capacitors 67 and 68, and resistor 69, may be used as shown in FIGURE 4.

The damper (diode or triode) serves essentially as a unidirectional switch to connect the discharge-induced electric energy, as current, from the magnetic fields of the inductive elements of the transformer 53 and the deflection yoke 58 to the B-boost storage capacitor 45. The voltage across capacitor 45 remains very nearly constant during each cycle. It increases slightly during each damper conducting period (during the first part of each essentially linear portion of the scanning cycle), and decreases slightly during the balance of each cycle.

If the damper acted precisely as a synchronous switch, and if the damper circuit had no electrical resistance, then the discharge current from the inductor circuits to capacitor 45 (considered as a fixed potential device) would be precisely linear, and essentially as shown by curve 124 to 125 in FIGURE 5. The damper and output tube (driver) currents, as indicated in FIGURE 5, are transformed to a common impedance basis, such as for instance, that of the deflection yoke. On this basis, it shows the damper current beginning at 126 and rising steeply in the negative direction to peak value 124. The steepness of this rise is dependent upon the dynamic characteristic of the associated inductance and capacitance values of the circuit. The essentially linear decay characteristic of the damper current between 124 and 125 is determined almost entirely by the decay rate of energy from a pure, fixed, inductance into a constant voltage sink, the B-boost capacitor 45. The various small resistive components add a small sawtooth wave component. Miscellaneous resonances which are also present may also add very small damped wave oscillation patterns which must be minimized. Both of these patterns are superimposed upon the sawtooth wave of current. Variations of the values of inductors 92, 93, and 95, capacitors 67, 68 94, 113 and 58*a*, and resistors 58*b* and 69, and possibly others not shown, are normally utilized to "trim-up" the performance of each particular system and design. This provides as nearly as possible a linear change of current, or in the practical application, an especially modified shape of saw-tooth current wave form in the horizontal deflection windings of the deflection yoke 58. This modification of the wave is required because of particular design conditions imposed by the deflection yoke and by the picture tube geometry.

The design criterion is the production of a constant rate of sweep of the luminous spot produced by the electron beam upon the flat or curved phosphor coated viewing screen of the cathode ray picture tube 57. This must be done with one electron beam in a monochrome picture tube and with three beams in a tri-color picture tube for color television.

The application of control grid 16, along with capacitors 67 and 68 and resistors 69, and possibly other circuit elements, to control the time constant and wave shaping effects, assist in the precise control of the damping action to achieve essentially the desired current wave in the deflection coil windings. The circuit composed of components 67, 68 and 69 may be altered to fulfill the desired performance characteristics. Small inductance coils may be utilized in this circuit in some instances, to shape the voltage wave applied between cathode 15 and grid 16 and thereby to modify the effective conductance of the damper tube controlled portion of the wave (126 to 125), as necessary. The use of the triode damper is preferred for best performance in this wave shaping action. When a triode damper is used, and especially when a diode damper is used, the inductors 92, 93 and 94, and capacitor 95 exert a major influence in producing an essentially linear time rate of electron beam deflection in tube 57.

While the damper portion of tube 11 is conducting, electrons pass through perforated, mesh, grid, or slotted portion, 19 of section 18 of anode 17, into space 20. A negative bias voltage applied to grid 21 with respect to anode 17 causes a cloud of electrons to develop in space 20, in somewhat the same fashion as the electron cloud near the emissive surface of a hot cathode. The result is the formation of a "virtual cathode" effect in this region. The passage of electrons from this region through grid 21, and through aperture 24 of cup 23 (which is connected to anode 17), is controlled by the potential applied to grid 21 with respect to anode 17 and 23, and to a much smaller extent by the voltage of anode 26 with respect to 17 and 23.

Grid 21 may be constructed as a single hole (aperture) in a plate, as a perforated (multi-hole) plate as shown by 21 in FIGURE 3, as a partially open mesh of wire, or as an assembly of spaced parallel wires or ribbons on a supporting frame.

When the electrons 25 of FIGURE 1 approach and pass through aperture 24 they become progressively accelerated toward anode 26, because of its high positive potential. This is of the order of 20 to 26 kv. with respect to element 23. Inertia carries most of these electrons through opening 27 and to the inside surface of anode 26, where their energy is dissipated. Louver lip 29 tends to prevent these electrons from bombarding glass seal 30 of wire lead 31.

The oppositely directed electrons 41 in the gap between the high and low voltage groups of elements are those of the equivalent high voltage diode portion, as detailed above. They flow during the retrace period, whereas the electron stream 25 (FIGURE 1) begins to flow just as the electron stream 41 is discontinuing, at the end of the "fly-back" pulse period.

The supply of electrons to space 20 (FIGURE 1), and hence of the available current, and the time period of current flow during each cycle of the voltage regulator action, is controlled by the damper current. There is, therefore, a second negative feedback coupling in my voltage regulator system, through the electron path from the damper to the voltage regulator, in addition to the coupling through the resistor network 100, 101 and 102. This enhances the regulator effectiveness considerably beyond that of a separate regulator tube in the presently used circuits.

Resistor network 100, 101 and 102, in combination with capacitor 49, is designed to have a time constant of the order of several hundred times the period of a single scanning cycle, so that the voltage applied to the control grid 21 with respect to the virtual cathode, as referenced by anode 17, is essentially D.C., as fed back from the boosted B+ voltage level at terminal 44.

The average level of voltage between grid 21 and anode (virtual cathode) 17 represents the "grid bias." Its variation from the average value represents the feedback of control signal to produce the intended regulation, as enhanced by the transconductance factor introduced by the grid.

The regulation is necessary to compensate for the changes in the average current demand of the cathode ray picture tube, for its electron beams. The high current necessary to produce an all white and very bright picture represents the maximum current load condition. An all black picture represented the minimum load condition, of essentially zero current. It is the duty of the shunt regulator portion of the tube (17, 21 and 26) to absorb the excess current available, but not otherwise drawn from storage capacitor 60 of picture tube 57, when the picture is *not* all white and of maximum brightness. The desired result is a constant load upon the high voltage winding 52 of transformer 53.

If this load decreases from the maximum value, then the excess stored energy which remains in the electromagnetic (inductive and capacitive) elements is transferred (less the losses) into the B-boost storage capacitance 45, where it increases the B-boost voltage across that storage capacitor 45. This increased voltage causes grid 21 to become less negative with respect to the virtual cathode of anode 17 and hence to pass more electrons to anode 26, to produce an added current load to compensate for the above postulated decrease in the load of the picture tube 57.

At the same time, the supply of electrons to the virtual cathode, from cathode 15 via holes 19 (or such other path as ma yexist), and also from secondary emission due to electrons striking anode 17 (parts 17 and 18) and possibly grid 21, is in proportion to the damper current. This is in turn in proportion to the energy remaining in the system (not used) after the "fly-back" pulse. There is therefore a direct negative feedback through the electron stream, and this is a fast acting (scan-to-scan) feedback which definitely improves upon the prior art action of the separate regulator tube. This is a positive advantage of this invention, beyond the engineering gains represented by mere combination of tube functions within a single envelope.

I claim:

1. A circuit for the control of a cathode ray tube having an anode together with condenser means for storing energy at high potential and applying such high potential to said anode, comprising means to deflect the electron beam of the cathode ray tube including an electromagnetic core having coil means coupled thereto; a tube having a first cathode, a control grid and a first anode both of which are in the path of some of the electrons from said first cathode, a second cathode, said first anode receiving electrons from both of said cathodes; means including a circuit that includes said first cathode, the first anode and at least a part of said coil means for damping oscillations in said coil means; means for applying an operating potential to the anode of the cathode ray tube including a circuit that includes said anode of said cathode ray tube, at least a part of said coil means, said second cathode and said first anode; said tube having a second anode and also having a second control grid and regulating means for controlling the potential on the anode of the cathode ray tube comprising means for rendering said first anode a virtual cathode and also comprising a circuit including the path from said virtual cathode to said second anode, the coil means and the anode of the cathode ray tube; said second control grid being between the virtual cathode and the second anode, said regulating means including means with a long time constant as compared to a scanning cycle for applying control voltage to biasing said second control grid in accordance with variations in potential of said coil means.

2. A circuit for the control of a cathode ray tube having an anode comprising a tube having a first cathode for emitting electrons, a control grid in the path of said electrons, a first anode for receiving electrons from said first cathode, a second cathode, and a second anode for receiving electrons from both cathodes; said second anode being connected electrically to said first anode to form a combined anode; electromagnetic means having coil means coupled therewith; said electromagnetic means including means for deflecting the beam of said cathode ray tube; damping means including at least part of said coil means, said first cathode and at least part of said combined anode, for damping the oscillations set up in said coil means; means for applying anode potential to the anode of the cathode ray tube including at least part of said coil means, said second cathode and at least part of combined anode; said tube having a third anode, said control grid being between the first cathode and said third anode; and means for regulating the potential on the anode of said cathode ray tube including said control grid and said third anode.

3. A circuit as defined in claim 2 in which said damping means includes an additional control grid between the first cathode and the combined anode including a voltage wave shaping circuit connected between said additional control grid and the first cathode.

4. A circuit for the control of a cathode ray tube having an anode comprising electromagnetic means including coil means coupled therewith; means for varying the field of said electromagnetic means according to a sweep potential wave form; sweep deflection means for said cathode ray tube energized by at least part of said coil means; a source of positive D.C. potential; a tube comprising a first cathode; a first control grid and a first anode in spaced series relation, a second cathode, said first anode being shaped and positioned to receive electrons from both of said cathodes; means for applying a potential to the anode of said cathode ray tube including a series circuit starting at said anode of the cathode ray tube, extending through at least part of said coil means, then passing from said second cathode to the first anode and finally to said source; means for damping oscillations in said coil means including a series circuit comprising at least part of the coil means, said first cathode and said first anode; said tube having a second anode and a second control grid, said second control grid being between the first cathode and the second anode, said second anode being connected to said second cathode; and means for regulating the potential on the anode of the cathode ray tube comprising a series circuit extending from said first cathode to the second anode, the last-named means including means with a time constant that is long compared to a scanning cycle for varying the potential on said second control grid in accordance with the potential of said coil means to regulate the flow of electrons to said second anode and thus control the potential on the anode of the cathode ray tube.

5. A circuit as defined in claim 4 in which the first anode is positioned to partially shield said second control grid.

6. A circuit as defined in claim 4 in which the first anode is a metal electrode at least partly enclosing said second control grid to shield the latter.

7. A circuit as defined in claim 4 in which all of the elements of said tube are enclosed in a single envelope of insulating material, said second cathode and said anode having terminals extending through the envelope and being insulated thereby from all other portions of the circuit.

8. A circuit as defined in claim 4 in which said first anode has parallel perforate plates with said second control grid between the perforations in the plates, so that a virtual cathode is formed, the electrons of which are controlled by the second cathode.

9. A circuit fof the control of a cathode ray tube; said cathode ray tube having an anode; condenser means for applying high voltage to said anode; a transformer having coil means including an input; means for producing a current wave that periodically has a rapid decrease in current and applying said current wave to the input of the transformer; beam deflecting means for the cathode ray tube energized by said coil means; a combined voltage regulating and damper tube including a first group of electrodes operating at a relatively low potential and a second group of electrodes operating at a relatively high potential; said first and second groups of electrodes being in substantially spaced relation to each other; damping means for damping oscillations in said coil means comprising a circuit including said coil means, a damping element, and means to connect the coil means to the damping element in response to unwanted oscillations; and the last-named means comprising a plurality of the electrodes of the first group; and a voltage regulating circuit including said coil means and the anode of the cathode ray tube, and control means for at least partially reducing voltage variations on the anode of the cathode ray tube when the beam current of the cathode ray tube is reduced, the last-named means comprising the second group of electrodes and at least a part of said first group of electrodes.

10. A circuit for the control of a cathode ray tube as defined in claim 9 in which the first group of electrodes includes an anode and a cathode connected in series with said damper circuit to connect said coil means to said damping element in response to unwanted oscillations in said coil means; and said second group of electrodes comprising an anode and a cathode connected together, the last-named anode being arranged so that it is fed with electrons from the first group of electrodes and the last-named cathode feeding electrons to the anode of the second group of electrodes.

11. A circuit for the control of a cathode ray tube as defined in claim 10 in which the first group of electrodes includes a control grid for controlling the flow of electrons from said first group of electrodes to the anode of the second group of electrodes, said control means including means connected to said grid to control the latter.

12. A circuit as defined in claim 11 in which at least some of the electrodes of the first group produce a virtual cathode for delivering electrons to the second group of electrodes as aforesaid.

References Cited by the Examiner

UNITED STATES PATENTS

| | | | |
|---|---|---|---|
| 2,037,357 | 4/1936 | Zottu | 313—303 |
| 2,172,198 | 9/1939 | Harniach | 313—303 |
| 3,077,550 | 2/1963 | Macovski | 315—22 |
| 3,122,674 | 2/1964 | Buechel | 315—22 |

ROBERT L. GRIFFIN, *Primary Examiner.*

T. A. GALLAGHER, *Assistant Examiner.*